(12) United States Patent
Morgan et al.

(10) Patent No.: US 10,194,246 B2
(45) Date of Patent: Jan. 29, 2019

(54) MAGNET AND COIL ASSEMBLY

(71) Applicant: Correlated Magnetics Research, LLC., Huntsville, AL (US)

(72) Inventors: Jason N. Morgan, Brownsboro, AL (US); Micah B. Harvey, Madison, AL (US); Larry W. Fullerton, New Hope, AL (US); Mark D. Roberts, Huntsville, AL (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 354 days.

(21) Appl. No.: 15/005,453

(22) Filed: Jan. 25, 2016

(65) Prior Publication Data

US 2016/0212545 A1    Jul. 21, 2016

Related U.S. Application Data

(63) Continuation-in-part of application No. 14/810,055, filed on Jul. 27, 2015, now Pat. No. 9,245,677, which
(Continued)

(51) Int. Cl.
*H02K 41/03* (2006.01)
*H04R 9/02* (2006.01)
(Continued)

(52) U.S. Cl.
CPC .......... *H04R 9/025* (2013.01); *H01F 7/0205* (2013.01); *H01F 7/0289* (2013.01); *H02K 1/17* (2013.01);
(Continued)

(58) Field of Classification Search
CPC .......... H04R 9/025; H04R 9/047; H04R 9/06; H02K 1/17; H02K 1/27
(Continued)

(56) References Cited

U.S. PATENT DOCUMENTS 5,604,815 A * 2/1997 Paddock ................ H04R 9/025
381/182
6,259,800 B1 * 7/2001 Tagami .................. H04R 9/025
381/398
(Continued)

*Primary Examiner* — Thanh Lam
(74) *Attorney, Agent, or Firm* — Schwegman Lundberg & Woessner, P.A.

(57) ABSTRACT

A magnet and coil assembly comprises a multi-pole magnetic structure, a coil, an object associated with the coil, and a circuitry for applying a current through the coil. The multi-pole magnetic structure comprises a plurality of magnetic source regions that each extend from a first side of said multi-pole magnetic structure to a second side of said multi-pole magnetic structure and include a first magnetic source region having a first polarity and a second magnetic source region having a second polarity. The multi-pole magnetic structure has a polarity transition region having a polarity transition boundary corresponding to an outer perimeter of the first magnetic source region where a magnetic field measured on the first side or the second side of said multi-pole magnetic field structure transitions from the first polarity to said second polarity. The coil is configured proximate to the first side of said multi-pole magnetic structure and about the polarity transition boundary. When the current travels in a first current direction through the coil the object moves in a first movement direction and when the current travels in a second current direction through the coil the object moves in a second movement direction.

28 Claims, 15 Drawing Sheets

Related U.S. Application Data is a continuation-in-part of application No. 14/578,798, filed on Dec. 22, 2014, now Pat. No. 9,093,207, which is a continuation-in-part of application No. 14/258,723, filed on Apr. 22, 2014, now Pat. No. 8,917,154, which is a continuation-in-part of application No. 14/103,699, filed on Dec. 11, 2013, now Pat. No. 8,937,521, which is a continuation-in-part of application No. 14/072,664, filed on Nov. 5, 2013, which is a continuation-in-part of application No. 13/960,651, filed on Aug. 6, 2013.

(60) Provisional application No. 62/257,992, filed on Nov. 20, 2015, provisional application No. 62/202,677, filed on Aug. 7, 2015, provisional application No. 61/854,333, filed on Apr. 22, 2013, provisional application No. 61/852,431, filed on Mar. 15, 2013, provisional application No. 61/735,403, filed on Dec. 10, 2012, provisional application No. 61/796,253, filed on Nov. 5, 2012, provisional application No. 61/742,273, filed on Aug. 6, 2012.

(51) Int. Cl.
*H01F 7/02* (2006.01)
*H02K 1/17* (2006.01)
*H02K 1/27* (2006.01)
*H02K 41/035* (2006.01)
*H04R 9/06* (2006.01)

(52) U.S. Cl.
CPC ........... *H02K 1/27* (2013.01); *H02K 41/0356* (2013.01); *H04R 9/063* (2013.01)

(58) Field of Classification Search
USPC ............................... 310/12.16, 12.21, 12.24
See application file for complete search history.

(56) References Cited

U.S. PATENT DOCUMENTS 6,735,322 B1 * 5/2004 Watanabe .............. H04R 9/041
  381/401
8,848,968 B1 * 9/2014 James, Jr. ................ H04R 9/06
  381/412

* cited by examiner

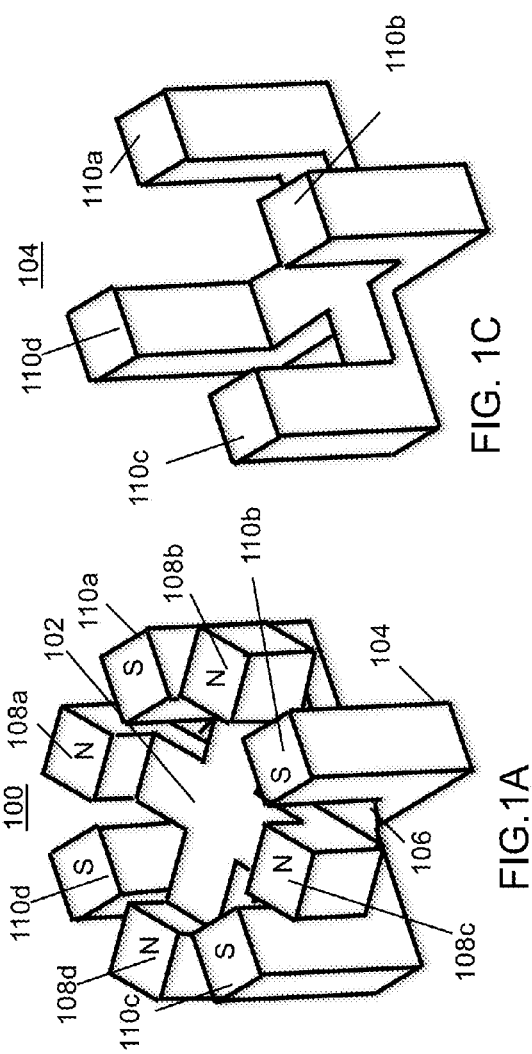
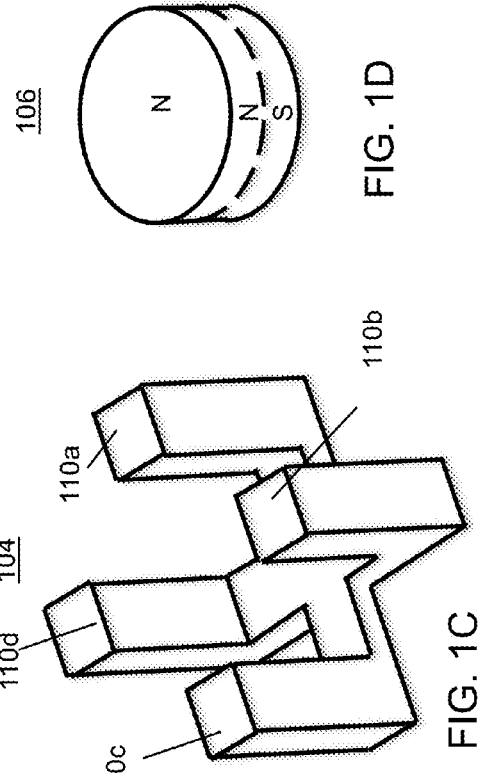
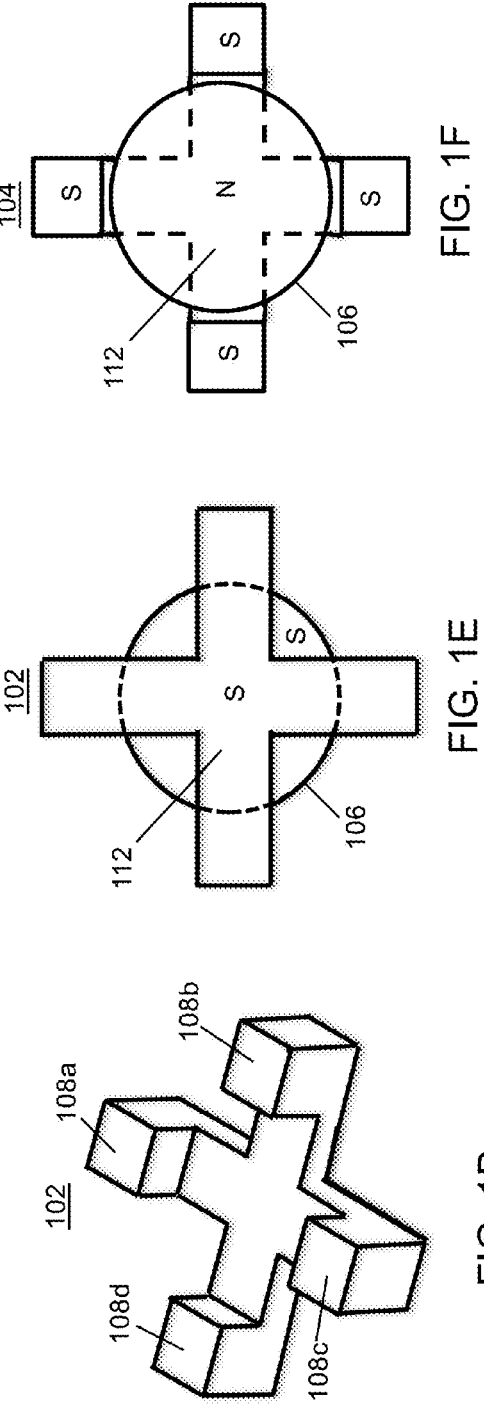
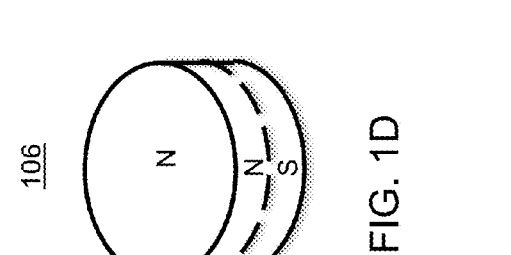
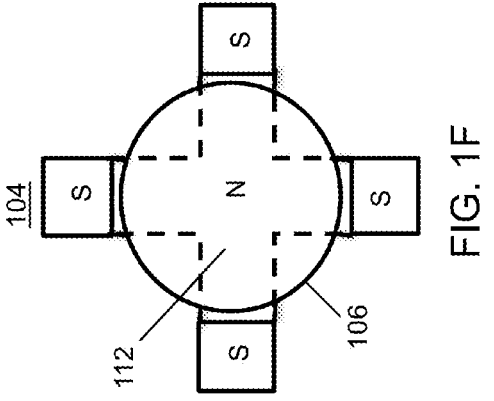
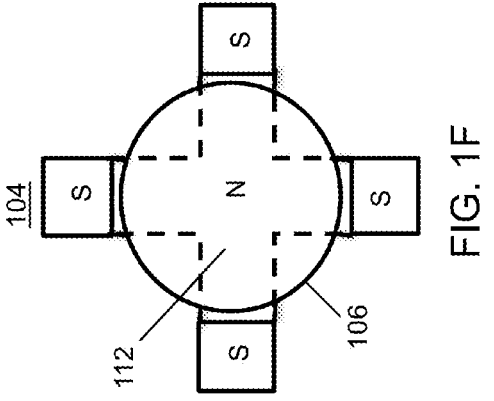

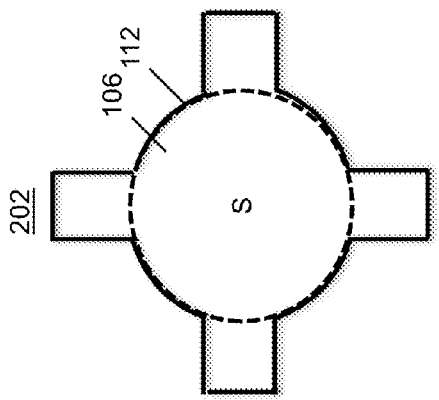
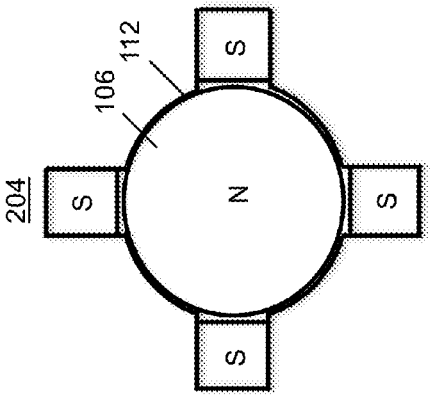
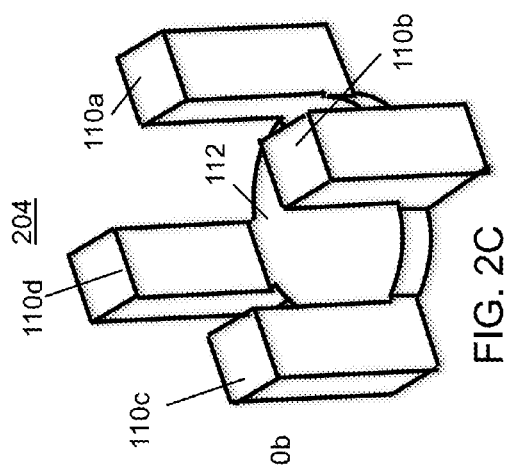
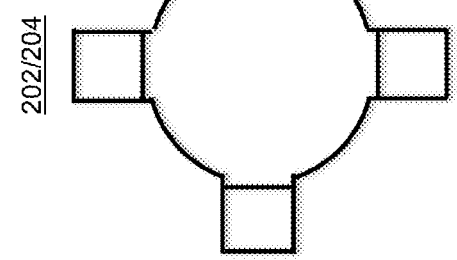
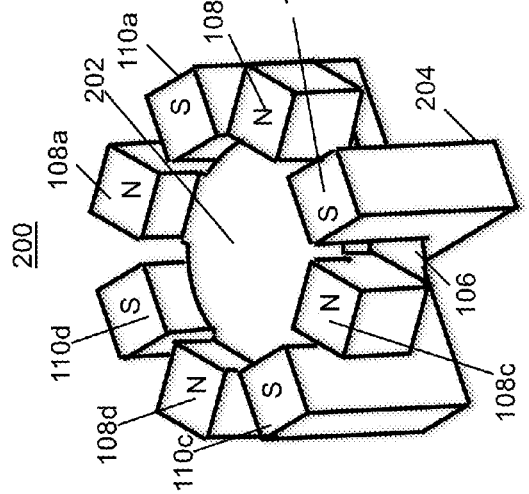
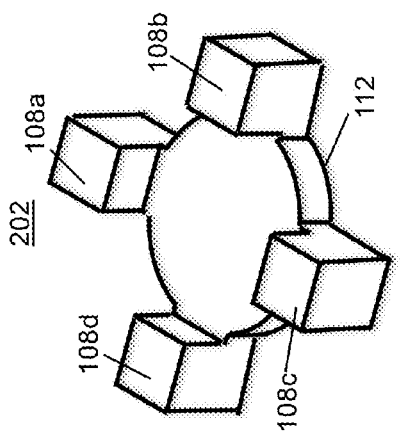

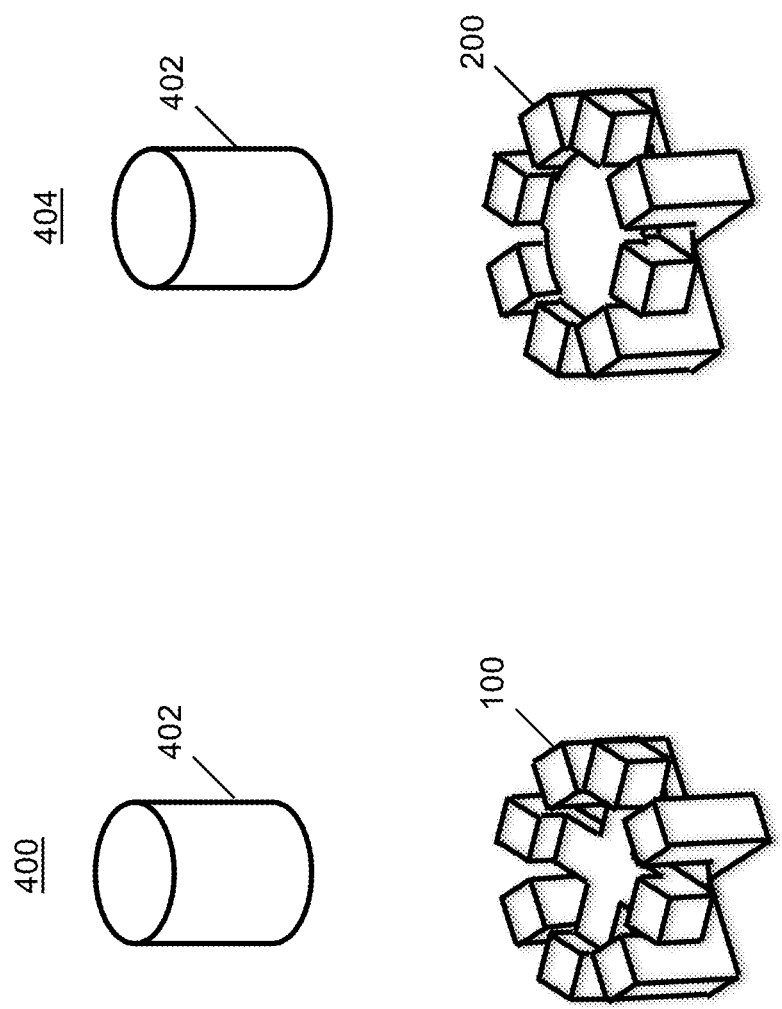

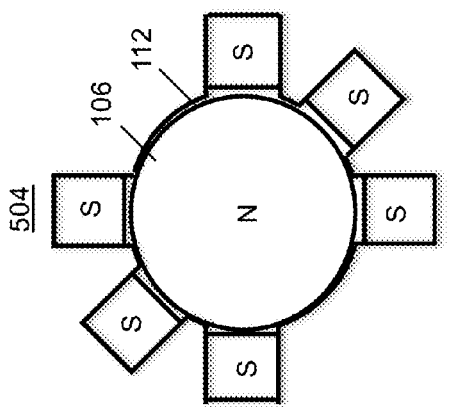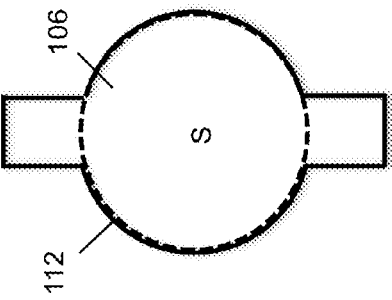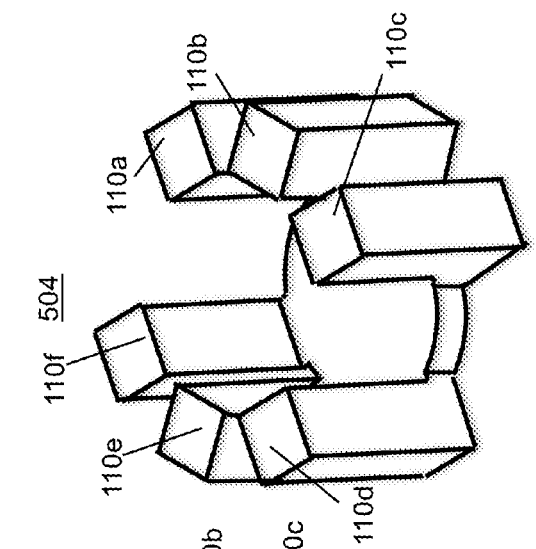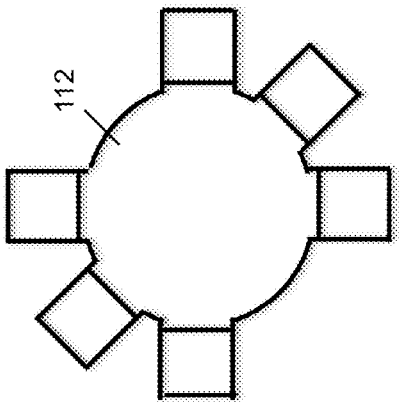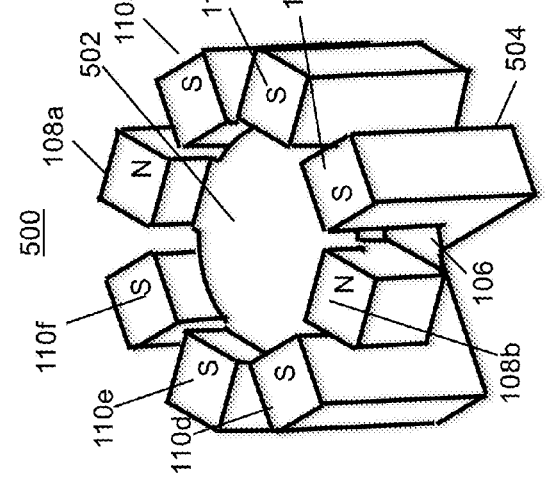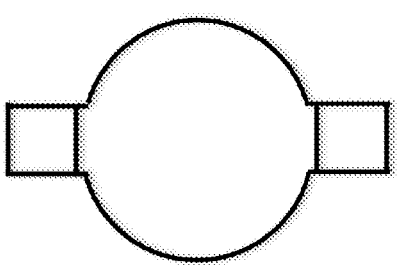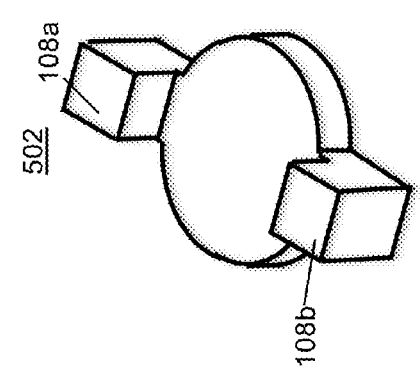

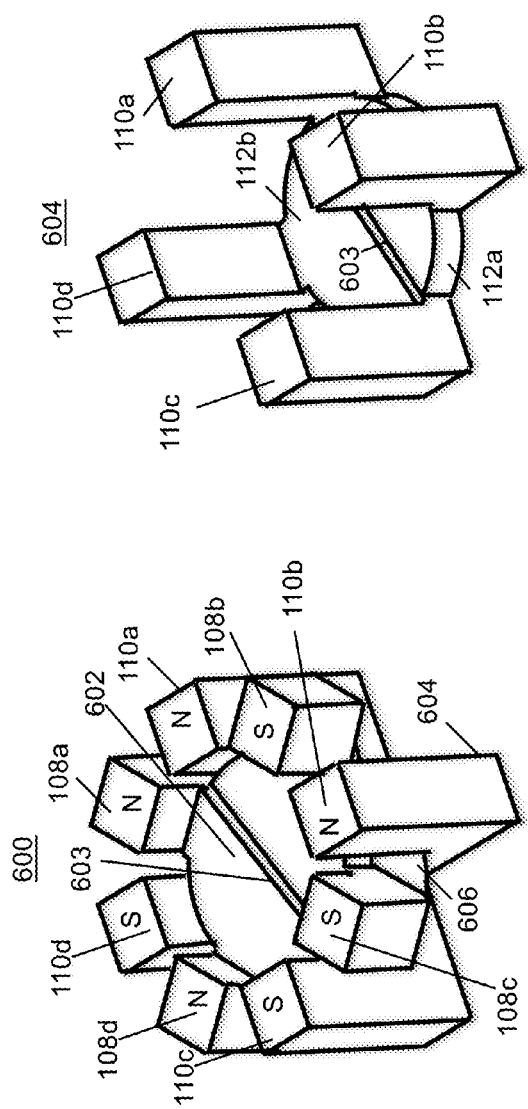
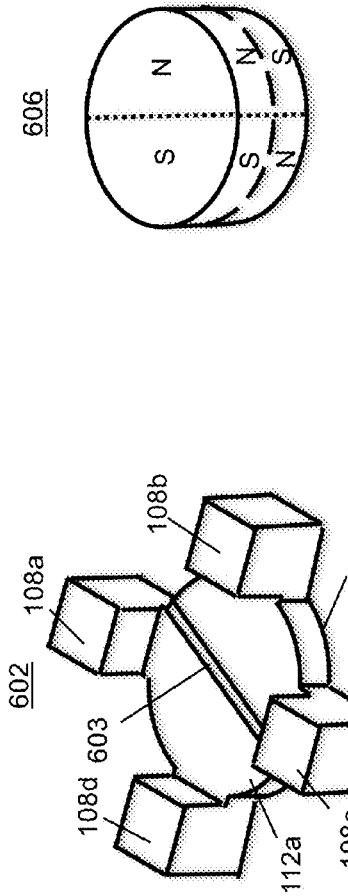
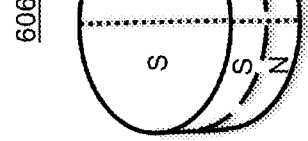
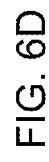

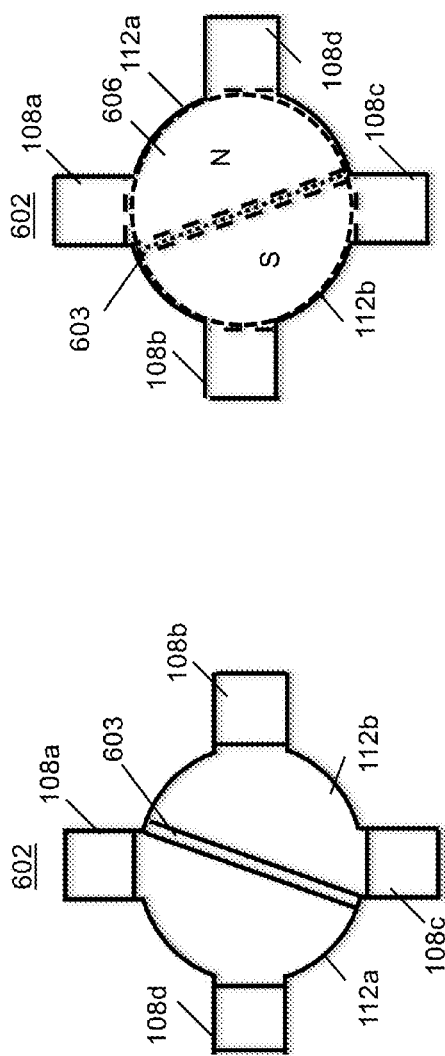
FIG. 6E (Top View)
FIG. 6G (Bottom View)
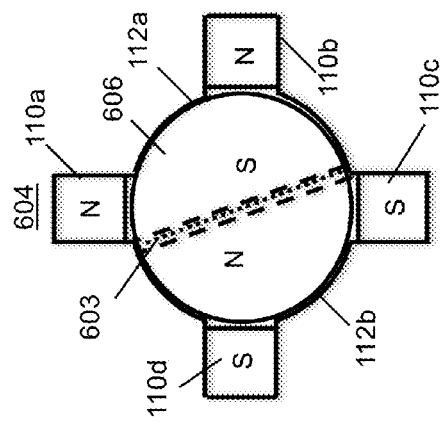
FIG. 6H (Top View)
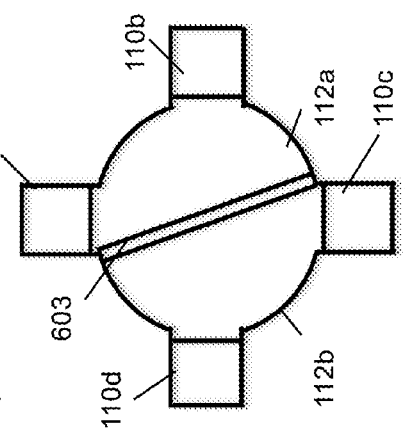
FIG. 6F (Top View)

Side View
(Prior Art)

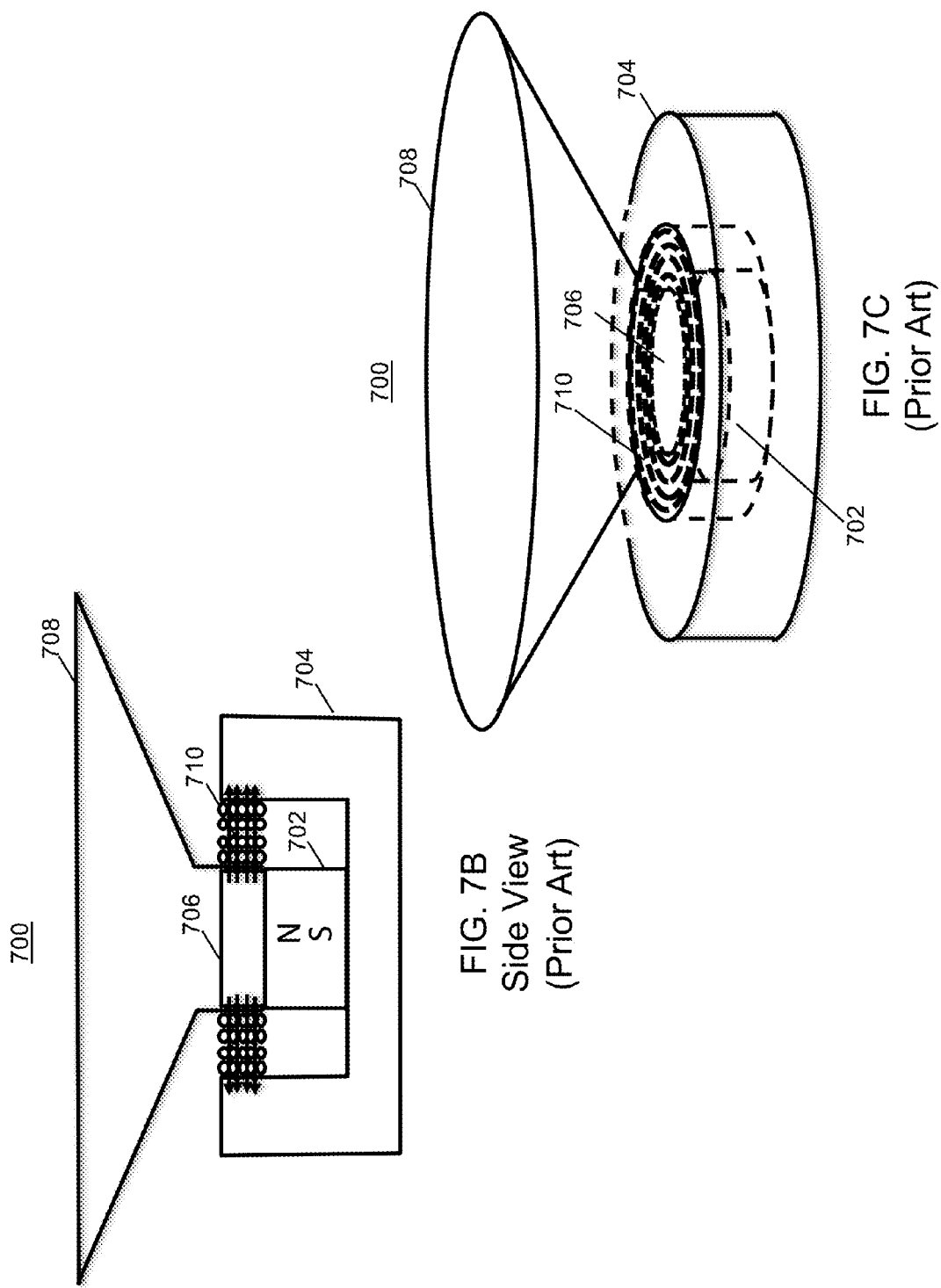

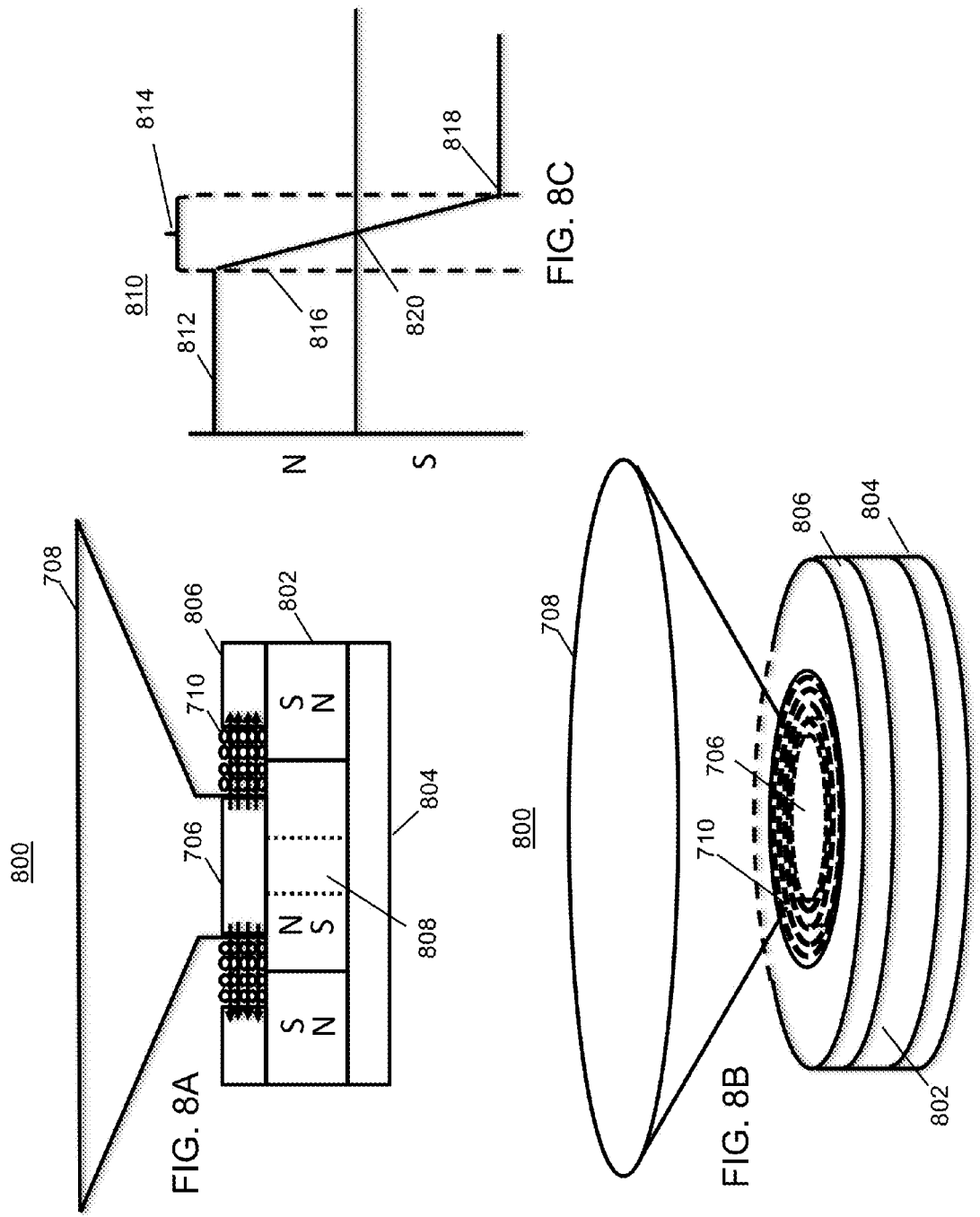

MAGNET AND COIL ASSEMBLY

RELATED APPLICATIONS

This application claims the benefit under 35 USC 119(e) of provisional application 62/257,992, titled "Magnetic System", filed Nov. 20, 2015 by Coates et al. and provisional application 62/202,677, titled "Speaker Magnet and Coil Arrangement", filed Aug. 7, 2015 by Morgan et al.

This application is a continuation-in-part of non-provisional application Ser. No. 14/810,055, titled "System for Concentrating and Controlling Magnetic Flux of a Multi-pole Magnetic Structure", filed Jul. 27, 2015 by Fullerton et al., which is a continuation-in-part of non-provisional application Ser. No. 14/578,798, titled "System for Concentrating and Controlling Magnetic Flux of a Multi-pole Magnetic Structure", filed Dec. 22, 2014, now U.S. Pat. No. 9,093,270, which is a continuation-in-part of non-provisional application Ser. No. 14/258,723, titled "System for Concentrating Flux of a Multi-pole Magnetic Structure", filed Apr. 22, 2014 by Fullerton et al., now U.S. Pat. No. 8,917,154, which claims the benefit under 35 USC 119(e) of provisional application 61/854,333, titled "System for Concentrating Flux", filed Apr. 22, 2013 by Fullerton et al.; Ser. No. 14/258,723 is a continuation-in-part of non-provisional application Ser. No. 14/103,699, titled "System for Concentrating Flux of a Multi-pole Magnetic Structure", filed Dec. 11, 2013 by Fullerton et al., now U.S. Pat. No. 8,937,521, which claims the benefit under 35 USC 119(e) of provisional application 61/735,403, titled "System for Concentrating Magnetic Flux of a Multi-pole Magnetic Structure", filed Dec. 12, 2012 by Fullerton et al. and provisional application 61/852,431, titled "System for Concentrating Magnetic Flux of a Multi-pole Magnetic Structure", filed Mar. 15, 2013 by Fullerton et al.

This application is also a continuation-in-part of non-provisional application Ser. No. 14/072,664, titled "System for Controlling Magnetic Flux of a Multi-Pole Magnetic Structure, filed Nov. 5, 2013 by Evans et al., which claims the benefit under 35 USC 119(e) of provisional application 61/796,253, titled "Magnetic Attachment System Having a Multi-pole Magnetic Structure and Pole Pieces" filed Nov. 5, 2012 by Evans et al.; Ser. No. 14/072,664 is a continuation-in-part of non-provisional application Ser. No. 13/960,651, titled "Magnetic Attachment System Having a Multi-pole Magnetic Structure and Pole Pieces", filed Aug. 6, 2013 by Fullerton et al., which claims the benefit under 35 USC 119(e) of provisional application 61/742,273, titled "Tablet Cover Attachment" filed Aug. 6, 2012, by Swift et al. and provisional application 61/796,253, titled "System for Controlling Flux of a Multi-Pole Magnetic Structure" filed Nov. 5, 2012, by Evans et al.

The applications and patents listed above are all incorporated by reference herein in their entirety.

FIELD OF THE INVENTION

The present invention relates generally to a system for concentrating and controlling magnetic flux of a multi-pole magnetic structure. More particularly, the present invention relates to a system for concentrating magnetic flux of a multi-pole magnetic structure using pole pieces having a magnet-to-pole piece interface with a first area and a pole piece-to-target interface with a second area substantially smaller than the first area, where the target can be a ferromagnetic material or complementary pole pieces and for controlling the concentrated magnetic flux using a movable magnetic circuit located between the target and multi-pole magnetic structure, where the position of the movable magnetic circuit relative to the multi-pole magnetic structure, the positions of elements of the magnetic circuit relative to other elements and/or the position of elements of the multi-pole magnetic structure relative to other elements of the magnetic structure determines the flux emitted from the combined structure.

SUMMARY OF THE INVENTION

In accordance with one aspect of the invention, a magnet and coil assembly comprises a multi-pole magnetic structure, a coil, an object associated with the coil, and a circuitry for applying a current through the coil. The multi-pole magnet comprises a plurality of magnetic source regions that each extend from a first side of the multi-pole magnetic structure to a second side of the multi-pole magnetic structure, the plurality of magnetic source regions including a first magnetic source region having a first polarity and a second magnetic source region having a second polarity, the second polarity being opposite the first polarity, the multi-pole magnetic structure having a polarity transition region having a polarity transition boundary corresponding to an outer perimeter of the first magnetic source region, the polarity transition boundary being where a magnetic field measured on the first side or the second side of the multi-pole magnetic field structure transitions from the first polarity to the second polarity. The coil is configured about the polarity transition boundary on the first side of the multi-pole magnet. When the current travels in a first current direction through the coil the object moves in a first movement direction and when the current travels in a second current direction through the coil that is opposite to the first current direction the object moves in a second movement direction that is opposite to the first movement direction.

The plurality of magnetic source regions can share a common center.

At least one of the plurality of magnetic source regions can be one of substantially circular or substantially rectangular.

The plurality of magnetic source regions can be a plurality of concentric circular magnetic regions.

The first magnetic source region can be surrounded by the second magnetic source region.

The object can be a speaker cone.

The magnet and coil assembly can also include a shunt plate proximate to the second side of the multi-pole magnetic structure configured to route flux between magnetic source regions of the plurality of magnetic source regions having opposite polarities.

The plurality of magnetic source regions can include a third magnetic source region having the first polarity.

The third magnetic source region can surround the second magnetic source region, where a second perimeter of the second magnetic source region and a perimeter of the third magnetic source region corresponds to a second polarity transition region having a second polarity transition boundary, the second polarity transition boundary being where a magnetic field measured on the first side or the second side of the multi-pole magnetic field structure transitions from the first polarity to the second polarity, where the magnet and coil assembly can also include a second coil about the second polarity transition boundary on the first side of the multi-pole magnet, a second object associated with the second coil and a second circuitry for applying a second current through the second coil, where when the second current travels in a third current direction through the second coil the second object moves in a third movement direction and when the second current travels in a fourth current direction through the second coil that is opposite to the third current direction the second object moves in a fourth movement direction that is opposite to the third movement direction.

The first magnetic source and the third magnetic source region can each be surrounded by the second magnetic source region, where a second perimeter of the second magnetic source region and a perimeter of the third magnetic source region corresponds to a second polarity transition region having a second polarity transition boundary, where the magnet and coil assembly can also include a second coil about the second polarity transition boundary on the first side of the multi-pole magnet, a second object associated with the second coil, and a second circuitry for applying a second current through the second coil, wherein when the second current travels in a third current direction through the second coil the second object moves in a third movement direction and when the second current travels in a fourth current direction through the second coil that is opposite to the third current direction the second object moves in a fourth movement direction that is opposite to the third movement direction.

The magnet and coil assembly may also include at least one of a first pole piece and a second pole piece, the first pole piece having a first side, a second side opposite the first side and a third side corresponding to a perimeter of the first pole piece, the first side of the first pole piece being proximate to the first side of the multi-pole magnetic structure, the perimeter of the first pole piece being inside a perimeter of the first magnetic source region, the first pole piece being configured to route a first magnetic flux of the first magnetic source region substantially ninety degrees from a first pole-piece-to magnet interface corresponding to the first side of the first pole piece to a first pole-piece-to-target interface corresponding to the third side of the first pole piece, the first pole-piece-to-magnet interface having a first area, the first pole-piece-to-target interface having a second area, the second pole piece having a first side, a second side opposite the first side and a third side corresponding to a perimeter of the second pole piece, the first side of the second pole piece being proximate to the first side of the multi-pole magnetic structure, the perimeter of the second pole piece being outside the perimeter of the first magnetic source region, the second pole piece being configured to route a second magnetic flux of the second magnetic source region substantially ninety degrees from a second pole-piece-to magnet interface corresponding to the first side of the second pole piece to a second pole-piece-to-target interface corresponding to the third side of the second pole piece, the second pole-piece-to-magnet interface having a third area, the second pole-piece-to-target interface having a fourth area, the coil being between the first pole piece and the second pole pieces.

The multi-pole magnetic structure has a first saturation flux density and the first pole piece has a second saturation flux density and the routing of the first magnetic flux through the first pole piece results in an amount of concentration of the first magnetic flux at the first pole piece-to-target interface corresponding to a first ratio of the first area divided by the second area, the amount of concentration of the first magnetic flux being limited by a second ratio of the second saturation flux density divided by the first saturation flux density, wherein the first pole-piece-to-target interface achieves the second saturation flux density when the first ratio equals the second ratio, and wherein the first ratio is at least fifty percent of the second ratio.

The multi-pole magnetic structure has a first saturation flux density and the second pole piece has a second saturation flux density and the routing of the second magnetic flux through the second pole piece results in an amount of concentration of the second magnetic flux at the second pole piece-to-target interface corresponding to a first ratio of the third area divided by the fourth area, the amount of concentration of the second magnetic flux being limited by a second ratio of the second saturation flux density divided by the first saturation flux density, wherein the second pole-piece-to-target interface achieves the second saturation flux density when the first ratio equals the second ratio, and wherein the first ratio is at least fifty percent of the second ratio.

The magnet and coil assembly can also include a second coil about the first polarity transition boundary on the second side of the multi-pole magnet, a second object associated with the second coil, and a second circuitry for applying a second current through the second coil, wherein when the second current travels in a third current direction through the second coil the second object moves in a third movement direction and when the second current travels in a fourth current direction through the second coil that is opposite to the third current direction the second object moves in a fourth movement direction that is opposite to the third movement direction, where the second object can be a second speaker cone.

The magnet and coil assembly can also include at least one of a third pole piece and a fourth pole piece, the third pole piece having a first side, a second side opposite the first side and a third side corresponding to a perimeter of the third pole piece, the first side of the third pole piece being proximate to the second side of the multi-pole magnetic structure, the perimeter of the third pole piece being inside a perimeter of the first magnetic source region, the third pole piece being configured to route a first magnetic flux of the first magnetic source region substantially ninety degrees from a third pole-piece-to magnet interface corresponding to the first side of the third pole piece to a third pole-piece-to-target interface corresponding to the third side of the third pole piece, the third pole-piece-to-magnet interface having a fifth area, the third pole-piece-to-target interface having a sixth area, the fourth pole piece having a first side, a second side opposite the first side and a third side corresponding to a perimeter of the fourth pole piece, the first side of the fourth pole piece being proximate to the second side of the multi-pole magnetic structure, the perimeter of the fourth pole piece being outside the perimeter of the first magnetic source region, the fourth pole piece being configured to route a second magnetic flux of the second magnetic source region substantially ninety degrees from a fourth pole-piece-to magnet interface corresponding to the first side of the fourth pole piece to a fourth pole-piece-to-target interface corresponding to the third side of the fourth pole piece, the fourth pole-piece-to-magnet interface having a seventh area, the fourth pole-piece-to-target interface having an eighth area.

The multi-pole magnetic structure has a first saturation flux density and the third pole piece has a second saturation flux density and the routing of the third magnetic flux through the third pole piece results in an amount of concentration of the third magnetic flux at the third pole piece-to-target interface corresponding to a first ratio of the fifth area divided by the sixth area, the amount of concentration of the third magnetic flux being limited by a second ratio of the second saturation flux density divided by the first saturation flux density, wherein the third pole-piece-to-target interface achieves the second saturation flux density when the first ratio equals the second ratio, and wherein the first ratio is at least fifty percent of the second ratio.

The multi-pole magnetic structure has a first saturation flux density and the fourth pole piece has a second saturation flux density and the routing of the fourth magnetic flux through the fourth pole piece results in an amount of concentration of the fourth magnetic flux at the fourth pole piece-to-target interface corresponding to a first ratio of the seventh area divided by the eighth area, the amount of concentration of the fourth magnetic flux being limited by a second ratio of the second saturation flux density divided by the first saturation flux density, wherein the fourth pole-piece-to-target interface achieves the second saturation flux density when the first ratio equals the second ratio, and wherein the first ratio is at least fifty percent of the second ratio.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIGS. 1A-1F depict a first exemplary magnetic system in accordance with the invention that corresponds to a circular eight pole alternating polarity pattern;

FIGS. 2A-2F depict a second exemplary magnetic system in accordance with the invention that corresponds to a circular eight pole alternating polarity pattern;

FIG. 4A depicts an exemplary measurement system comprising a magnetic sensor and a magnetic system like depicted in FIGS. 1A-1E;

FIG. 4B depicts an exemplary measurement system comprising a magnetic sensor and a magnetic system like depicted in FIGS. 2A-2E;

FIGS. 5A-5G depict a third exemplary magnetic system in accordance with the invention having a circular polarity pattern corresponding to two modulos of a Barker 4 code;

FIGS. 6A-6H depict a fourth exemplary magnetic system in accordance with the invention having a circular polarity pattern corresponding to a modulo of a Barker 4 code adjacent to a complementary modulo of a Barker 4 code;

FIGS. 7A, 7B and 7C depict an exemplary prior art speaker system;

FIGS. 8A and 8B depict an exemplary speaker system in accordance with the invention;

FIG. 8C depicts an exemplary magnetic field plot having a polarity transition region;

DETAILED DESCRIPTION OF THE INVENTION

Figure 3:
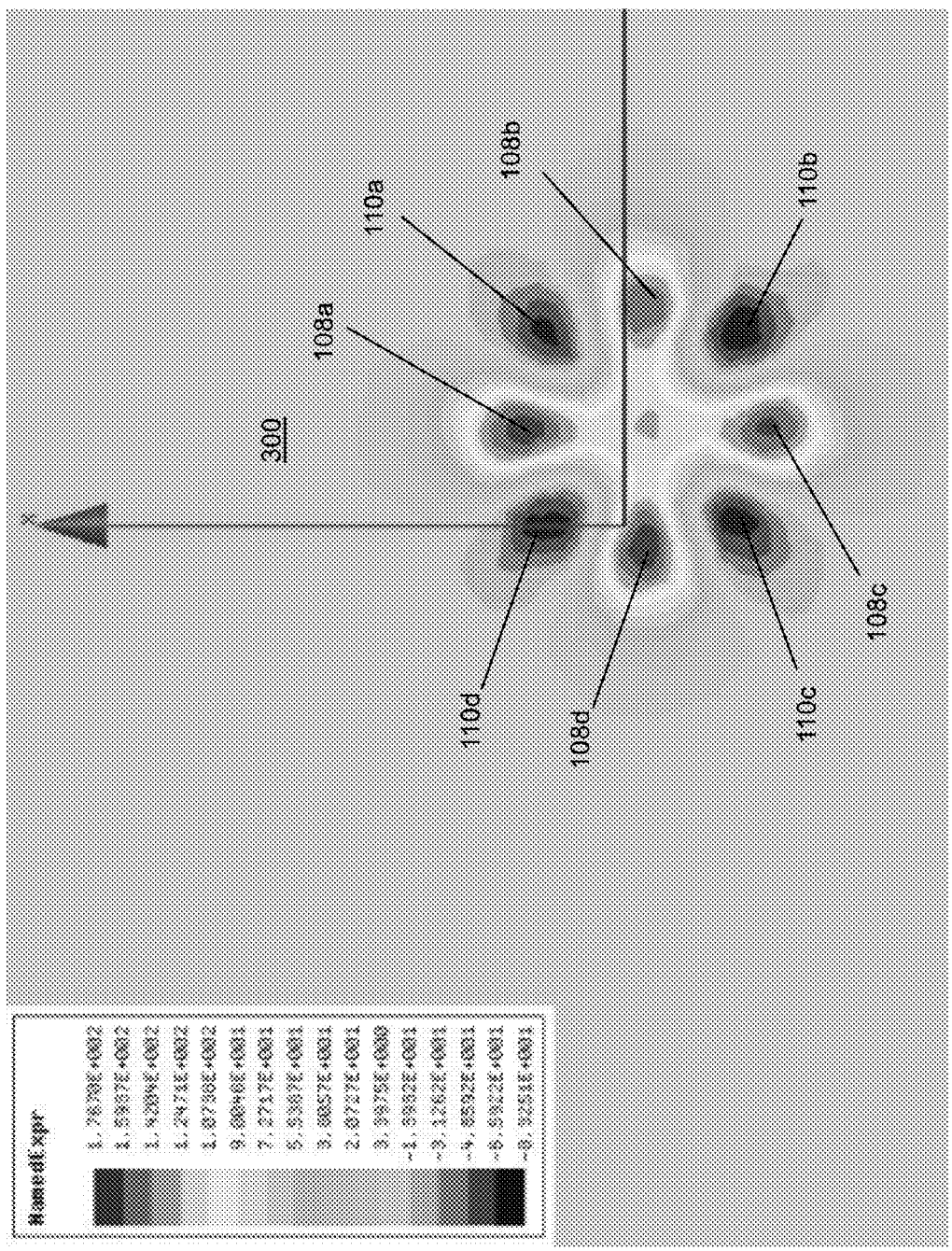
FIG. 3 depicts an exemplary magnetic field pattern.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

Certain described embodiments may relate, by way of example but not limitation, to systems and/or apparatuses for producing magnetic field emission structures, methods for producing magnetic field emission structures, magnetic field emission structures produced via magnetic printing, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219 issued on May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 or may otherwise involve magnetic structures that produce a composite force curve such as is described in U.S. patent application Ser. No. 14/808,770, filed Jul. 24, 2015, titled "System and Method for Tailoring Magnetic Forces", which are all incorporated herein by reference in their entirety. Material presented herein may relate to and/or be implemented in conjunction with energy generation systems and methods such as described in U.S. Pat. No. 8,760,250 issued Jun. 24, 2014, which is all incorporated herein by reference in its entirety. Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, U.S. Pat. Nos. 7,817,002, 7,817,003, 7,817,004, 7,817,005, and 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. Nos. 7,843,295, 7,843,296, and 7,843,297 issued Nov. 30, 2010, U.S. Pat. No. 7,893,803 issued Feb. 22, 2011, U.S. Pat. Nos. 7,956,711 and 7,956,712 issued Jun. 7, 2011, U.S. Pat. Nos. 7,958,575, 7,961,068 and 7,961,069 issued Jun. 14, 2011, U.S. Pat. No. 7,963,818 issued Jun. 21, 2011, and U.S. Pat. Nos. 8,015,752 and 8,016,330 issued Sep. 13, 2011 are all incorporated by reference herein in their entirety.

The number of dimensions to which coding can be applied to design correlated magnetic structures is very high giving the correlated magnetic structure designer many degrees of freedom. For example, the designer can use coding to vary magnetic source size, shape, polarity, field strength, and location relative to other sources in one, two, or three-dimensional space, and, if using electromagnets or electro-permanent magnets can even change many of the source characteristics in time using a control system. Various techniques can also be applied to achieve multi-level magnetism or composite force curve control where the interaction between two structures may vary depending on their separation distance. The possible combinations are essentially unlimited.

U.S. patent application Ser. No. 13/960,651, filed Aug. 6, 2013, entitled "Magnetic Attachment System Having a Multi-pole Magnetic Structure and Pole Pieces", which is incorporated by reference herein in its entirety, discloses a first multi-pole magnetic structure having pole pieces that direct flux to a second multi-pole magnetic structure.

U.S. patent application Ser. No. 14/072,664, filed Nov. 5, 2013, entitled "System for Controlling Magnetic Flux of A Multi-Pole Magnetic Structure", which is incorporated by reference herein in its entirety, discloses a moveable device comprising pole pieces between first and second magnetic structures where the relative location of the moveable device determines the flux directed between the first and second magnetic structures and the magnetic forces produced by the first and second magnetic structures.

U.S. Pat. No. 8,917,154, issued Dec. 23, 2014, U.S. Pat. No. 8,937,521, issued Jan. 20, 2015, and U.S. Pat. No. 9,093,270, issued Jul. 28, 2015, which are each incorporated by reference herein in their entirety, disclose various systems for concentrating magnetic flux of a multi-pole magnetic structure using pole pieces having a magnet-to-pole piece interface with a first area and a pole piece-to-target interface with a second area substantially smaller than the first area, where the target can be a ferromagnetic material or complementary pole pieces.

U.S. patent application Ser. No. 14/810,055, filed Jul. 27, 2015, entitled "System for Concentrating and Controlling Magnetic Flux of a Multi-Pole Magnetic Structure", which is incorporated by reference herein in its entirety, discloses various systems for concentrating and controlling magnetic flux where flux is routed 90°, 180°, or 360° relative to a surface of a magnetic structure and flux can be concentrated at a target (e.g., a surface of a ferromagnetic material or a gap) by controlling the ratio of a first area corresponding to a magnet-to-pole-piece interface and a second area corresponding to a pole-piece-to-target interface, where the maximum amount of concentration depends on the ratio of a first saturation flux density of the magnetic material and a second saturation flux density of the pole piece material. The described systems include systems involving a shunt plate, which is further described in U.S. Pat. No. 8,576,036, issued Nov. 5, 2013, which is incorporated by reference herein in its entirety.

In accordance with one aspect of the present invention, a magnetic system comprises a magnetic structure, which can be a single magnetic source (e.g., a magnet) or a multi-pole magnetic structure, a first pole piece structure that directs flux from an area of a surface of a magnetic source of the magnetic structure having a first polarity to a target and a second pole piece structure that directs flux from a second surface of the magnetic source of the magnetic structure having a second polarity to a target, where a target may be a ferromagnetic material or a gap. Flux may be directed, for example, 90° and −90° from a first pole-piece-to-magnet interface to one or more pole-piece-to-target interfaces having a first polarity and 90° and 90° from a second pole-piece-to-magnet interface to one or more pole-piece-to-target interfaces having a second polarity. The one or more pole-piece-to-target interfaces having the first polarity and the one or more pole-piece-to-target interfaces having the second polarity may produce a polarity pattern in a plane or correspond to some other desired shape, where the magnetic field of the combined pole-piece-to-target interfaces can be measured by one or more sensors to determine, for example, a translational or rotational position and/or a distance of an object relative to the one or more sensors. The polarity pattern may be a uniformly alternating polarity pattern or may be coded polarity pattern. The polarity pattern may be, for example, a cyclic pattern, a one-dimensional pattern, a two-dimensional pattern, or a three-dimensional pattern.

Referring to FIGS. 1A-1F, a first exemplary magnetic system 100 in accordance with the invention comprises a first pole piece structure 102, a second pole piece structure 104, and a magnetic structure 106 that is a magnet having a North polarity side and a South polarity side, where the magnetic structure 106 is configured between the first pole piece structure 102 and the second pole piece structure 104. The first pole piece structure 102 routes flux 90° and then −90° from the North polarity side of the magnet 106 to four pole-piece-to-target interfaces 108a-108d each having a North polarity. The second pole piece structure 104 routes flux 90° and then 90° from the South polarity side of the magnet 106 to four pole-piece-to-target interfaces 110a-110d each having a South polarity, where the combined pole-piece-to-target interfaces produce a magnetic field having a uniformly alternating polarity pattern that can be described as corresponding to an octupole polarity pattern. The bottom of the first pole piece structure 102 and the top of the second pole piece structure 104 each have a pole-piece-to-magnet interface 112 corresponding to the surface area of the pole piece structure 102 and 104 in contact with the magnetic structure 106 that is indicated by the dashed circles in FIGS. 1E and 1F. The magnet 106 in FIGS. 1D-1F is shown having a top side with a North polarity and bottom side with a South polarity but could be configured (i.e., turned over in the magnetic system 100) to have a top side with a South polarity and bottom side with a North polarity. In one embodiment, the sum of the area of the pole-pieceto-target interfaces 108a-108d is less than the surface area of the North polarity side of magnet 106. In another embodiment, the surface area of the pole-piece-to-target interfaces 108a-108d is the same as or even greater than the surface area of the North polarity side of magnet 106. In another embodiment, the spaces between the pole-piece-to-target interfaces 108a-108d and 110a-110d are filled with non-ferromagnetic material such as but not limited to epoxy that fixes the positions of the pole-piece-to-target interfaces 108a-108d and 110a-110d relative to each other. Such a material is ideally strong enough to overcome any attractive force between pole-piece-to-target interfaces having opposite polarity.

Referring to FIGS. 2A-2F, a second exemplary magnetic system 200 in accordance with the invention comprises a first pole piece structure 202, a second pole piece structure 204, and a magnetic structure 106 that is a magnet having a North polarity side and a South polarity side, where the magnetic structure 106 is configured between the first pole piece structure 202 and the second pole piece structure 204. The second exemplary magnetic system 200 is similar to the first exemplary magnetic system 100 except the first and second pole piece structures 202 and 204 are shaped such that they have pole-piece-to-magnet interfaces 112 shaped to substantially match with the shapes of the North and South polarity sides of the magnetic structure 106, respectively, where the outer (rising) portions of the pole pieces are not in contact with the magnet. In one embodiment, pole-piece-to-magnet interface 112 is sufficiently thick to avoid being fully saturated by magnet 106. In another embodiment, the pole-piece-to-magnet interface 112 is fully saturated by magnet 106.

FIG. 3 depicts an exemplary magnetic field pattern 300 produced by a magnetic system of the present invention, where the North and South polarities of the magnetic field pattern 300 corresponding to the various pole-piece-to-target interfaces 108a-108d and 110a-110d are indicated.

FIG. 4A depicts an exemplary measurement system 400 comprising a magnetic sensor 402, for example a Hall Effect sensor, and a magnetic system 100 like depicted in FIGS. 1A-1E.

FIG. 4B depicts an exemplary measurement system 404 comprising a magnetic sensor 402, for example a Hall Effect sensor, and a magnetic system 200 like depicted in FIGS. 2A-2E.

In accordance with a second aspect of some embodiments of the invention, the ratios of the surface areas of the pole-piece-to-magnet interfaces relative to the surface areas of the pole-piece-to-target interfaces can be controlled to concentrate flux (i.e., increase flux density) based on the ratio of the respective saturation flux densities of the pole piece material and the magnetic structure material. Under one embodiment of such an arrangement, the first and second pole pole piece structures 102 and 104 are tapered such that the eight pole-piece-to-target interfaces form a circle smaller than the North and Polarity sides of the magnetic structure 106.

In accordance with a third aspect of some embodiments of the invention, the ratios of the surface areas of the pole-piece-to-magnet interfaces relative to the surface areas of the pole-piece-to-target interfaces can be controlled to de-concentrate flux (i.e., decrease flux density) based on the ratio of the respective saturation flux densities of the pole piece material and the magnetic structure material. In one embodiment of such an arrangement, the first and second pole piece structures 102 and 104 are tapered such that the eight pole-piece-to-target interfaces form a circle larger than the North and Polarity sides of the magnetic structure 106.

In accordance with a fourth aspect of some embodiments of the invention, the magnetic field pattern of a magnetic structure in accordance with the invention can be in accordance with a code, for example two code modulos of a Barker 4 code, such as depicted in FIGS. 5A-5F. Referring to FIGS. 5A-5F, a third exemplary magnetic system 500 in accordance with an embodiment of the invention comprises a first pole piece structure 502, a second pole piece structure 504, and a magnetic structure 106 that is a magnet having a North polarity side and a South polarity side, where the magnetic structure 106 is configured between the first pole piece structure 502 and the second pole piece structure 504. The first pole piece structure 502 routes flux 90° and then −90° from the North polarity side of the magnet 106 to two pole-piece-to-target interfaces 108a and 108b each having a North polarity. The second pole piece structure 504 routes flux 90° and then 90° from the South polarity side of the magnet 106 to six pole-piece-to-target interfaces 110a-110f each having a South polarity, where the combined pole-piece-to-target interfaces produce a magnetic field having a polarity pattern that can be described as corresponding to two code modulos (i.e., instances) of a Barker 4 code (N N N S). The bottom of the first pole piece structure 502 and the top of the second pole piece structure 504 each have a pole-piece-to-magnet interface 112 corresponding to the surface area of the pole piece structure 502 and 504 in contact with the magnetic structure 106 that is indicated by the dashed circles in FIGS. 5E and 5F.

In accordance with another aspect of an embodiment of the invention, different pole-piece-to-target interface shapes can be used where the different shapes can be detected by a sensor. For example, one might be round, another a square, etc. Alternatively, one pole-piece-to-target interface might be subdivided into four pole-piece-to-target interfaces, another into three, etc.

Generally, flux can be directed from the back to the front of a magnetic structure using multiple connected pole pieces that can be configured in all sorts of different ways. For example, instead of a circular polarity pattern, they could be configured to produce a checkerboard polarity pattern or a linear polarity pattern.

Moreover, the combination of the pole-piece-to-target interface surfaces need not be a plane, but could correspond to a variety of 1D, 2D, or 3D surfaces, which could have all sorts of shapes including curved surfaces, pointy surfaces, etc.

Additionally, a magnetic structure can be a multi-pole magnet, for example, a magnetic structure having a plurality of maxels in a polarity pattern, where pole pieces can direct flux from the bottom of the magnetic structure and from the top of the structure into a single plane (or some other shape) where the combined polarity pattern of the combined pole-piece-to-target interfaces can be detected by a sensor.

FIGS. 6A-6H depict a fourth exemplary magnetic system in accordance with the invention having a circular polarity pattern corresponding to a modulo of a Barker 4 code adjacent to a complementary modulo of a Barker 4 code. Referring to FIGS. 6A-6H, a fourth exemplary magnetic system 600 in accordance with an embodiment of the invention comprises a first pole piece structure 602, a second pole piece structure 604, and a magnetic structure 606 that is a multi-pole magnet having a first side having half North polarity and half South polarity and a second side opposite the first side also having half North polarity and half South polarity, where the North polarity portion of the first side is opposite the South polarity portion of the second side and the South polarity portion of the first side is opposite the North polarity portion of the second side. First and second pole piece structures 602 and 604 each have non-magnetic portions 603, which might be made of aluminum, plastic, or any other non-magnetic material. The magnetic structure 606 is configured between the first pole piece structure 602 and the second pole piece structure 604. The first pole piece structure 602 routes flux 90° and then −90° from the North polarity portion of the first side of the magnetic structure 606 to two pole-piece-to-target interfaces 108a and 108d each having a North polarity. The first pole piece structure 602 also routes flux 90° and then −90° from the South polarity portion of the first side of the magnetic structure 606 to two pole-piece-to-target interfaces 108b and 108c each having a South polarity. The second pole piece structure 604 routes flux 90° and then 90° from the North polarity portion of the second side of the magnetic structure 606 to two pole-piece-to-target interfaces 110a and 110b each having a North polarity. The second pole piece structure 604 also routes flux 90° and then 90° from the South polarity portion of the second side of the magnetic structure 606 to two pole-piece-to-target interfaces 110c and 110d each having a South polarity. The combined pole-piece-to-target interfaces produce a magnetic field having a circular polarity pattern (N N S N S S N S) that can be described as corresponding to a modulo of a Barker 4a code (N N S N) adjacent to a modulo of a complementary Barker 4a code (S S N S). The bottom of the first pole piece structure 602 and the top of the second pole piece structure 604 each have a pole-piece-to-magnet interfaces 112a and 112b corresponding to the North and South polarity portions of the surface area of the pole piece structures 602 and 604 in contact with the magnetic structure 606 that are indicated by the dashed half circles in FIGS. 6G and 6H.

In accordance with the present invention, any object, e.g., speaker, mirror, person, vehicle, device, can be moved from a first to a second position using a multi-pole magnet situated proximate (e.g., near) of a coil positioned on or about a polarity transition region of the multi-pole magnet, as for example shown in FIG. 8C. The polarity transition region includes a polarity transition boundary where a magnetic field transitions from a first polarity to a second polarity. In one embodiment, objects associated with or attached to either the coil or the multi-pole magnet can be moved (or oriented) precisely, for example under the control of an object orientation controller with or without feedback.

Figure 7A:
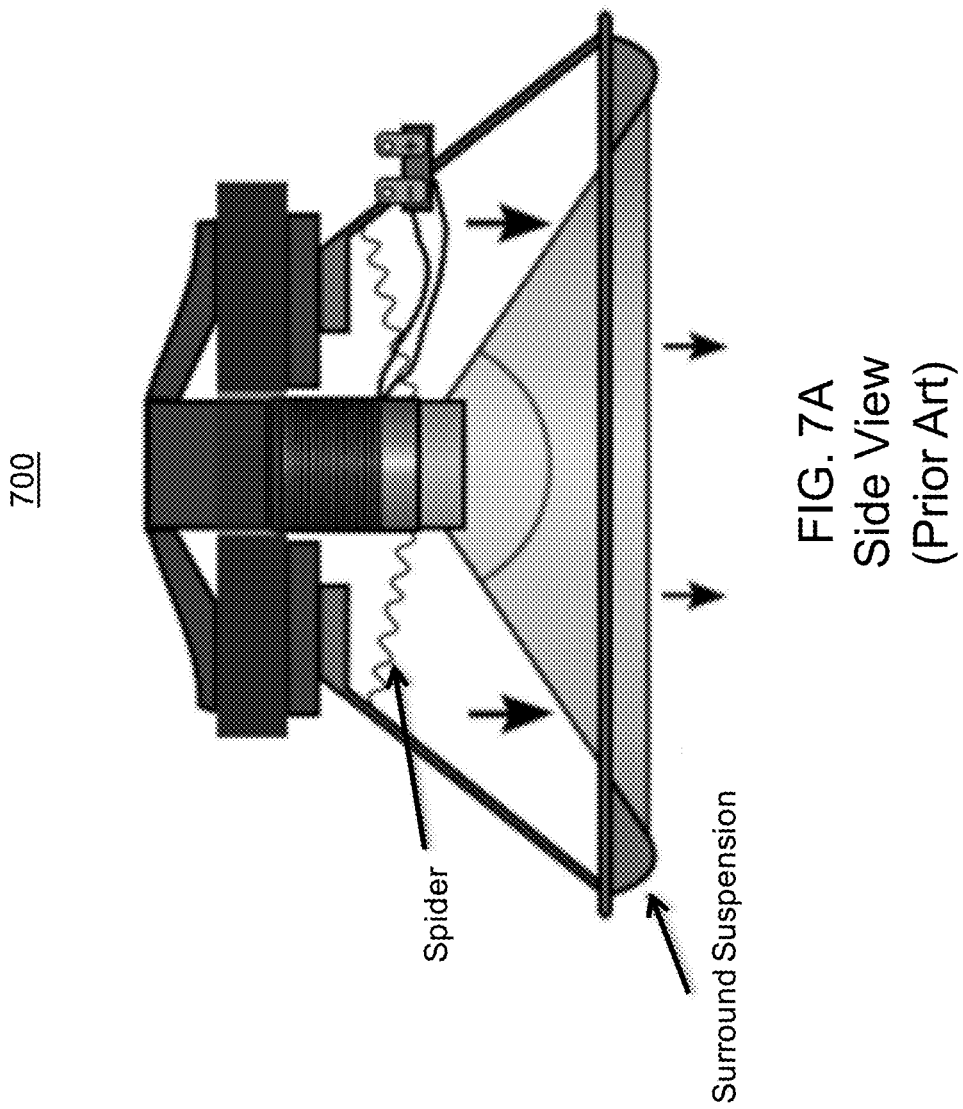

FIGS. 7A, 7B and 7C depict an exemplary prior art speaker system 700. Referring to FIGS. 7A, 7B and 7B, the speaker system 700 comprises a magnet 702, a cup-shaped first ferromagnetic flux circuit 704 that directs flux from the bottom side of the magnet (as shown) to the top side of the magnet, a round second ferromagnetic flux circuit 706 located on the top side of the magnet, and a coil 710 located between the first and second ferromagnetic flux circuits 704 and 706. Depending on the direction of current through the coil 710, a speaker cone 708 associated with the coil will move up or down, for example relative to a suspension reference show in FIG. 7A.

FIGS. 8A and 8B depict an exemplary speaker system 800 in accordance with the invention. Referring to FIGS. 8A and 8B, the speaker system 800 comprises a multi-pole magnet 802 having an inner portion having a first polarity orientation and an outer portion having a second polarity orientation that is opposite the first polarity orientation. Specifically, the multi-pole magnet 802 comprises an outer ring-shaped portion having a South-up polarity and an inner circular-shaped portion having a North-up polarity. On the bottom side of the magnet is shown an optional shunt plate 804, which can direct flux from the bottom side of the magnet to the top side of the magnet. On the top side of the multi-pole magnet 802 a ring-shaped first ferromagnetic flux circuit 806 is in contact with the outer portion of the magnet and a circular second ferromagnetic flux circuit 706 is in contact with the inner portion of the magnet. A coil 710 is located between the first and second ferromagnetic flux circuits 806 and 706. Depending on the direction of current through the coil 710, a speaker cone 708 associated with the coil 710 will move up or down. The multi-pole magnet 802 may optionally include a hole 808. The multi-pole magnet 802 may be produced by magnetizing a North polarity region into the South polarity side of an axially magnetized dipole magnet, or by magnetizing a South polarity region into the North polarity side of an axially magnetized dipole magnet. Similarly, a previously non-magnetized magnetizable material can have separately axially magnetized North and South polarity regions. Alternatively, the multi-pole magnet 802 an be replaced by combinations of discrete magnets, for example, an axially magnetized disc magnet can be inserted into an axially magnetized ring magnet to produce a multi-pole magnet structure, where the disc and ring magnets can be sized such that they fit together tightly, where an adhesive could optionally be used between the disc and ring magnets.

FIG. 8C depicts an exemplary magnetic field plot 810 that depicts an exemplary measured magnetic field 812 produced by adjacent magnetic sources having opposite polarities that includes an exemplary polarity transition region 814. Referring to FIG. 8C, the measured magnetic field 812 has a North polarity to the left of the polarity transition region 814 corresponding to a first magnetic source and a South polarity to the right of the polarity transition region 814 corresponding to a second magnetic source. The transition region has a first outer boundary 816 corresponding to approximately where the polarity transition from North to South polarity begins and a second outer boundary 818 corresponding to approximately where the polarity from North to South polarity ends and a polarity transition boundary 820 between the first and second outer boundaries 816 and 818 of the polarity transition region 814 where polarity is neither North or South. One skilled in the art will understand that the measured magnetic field 812 would typically not have straight lines or sharp angles and that the slope of the magnetic field 812 within the polarity transition region can be different than depicted.

Figure 9:
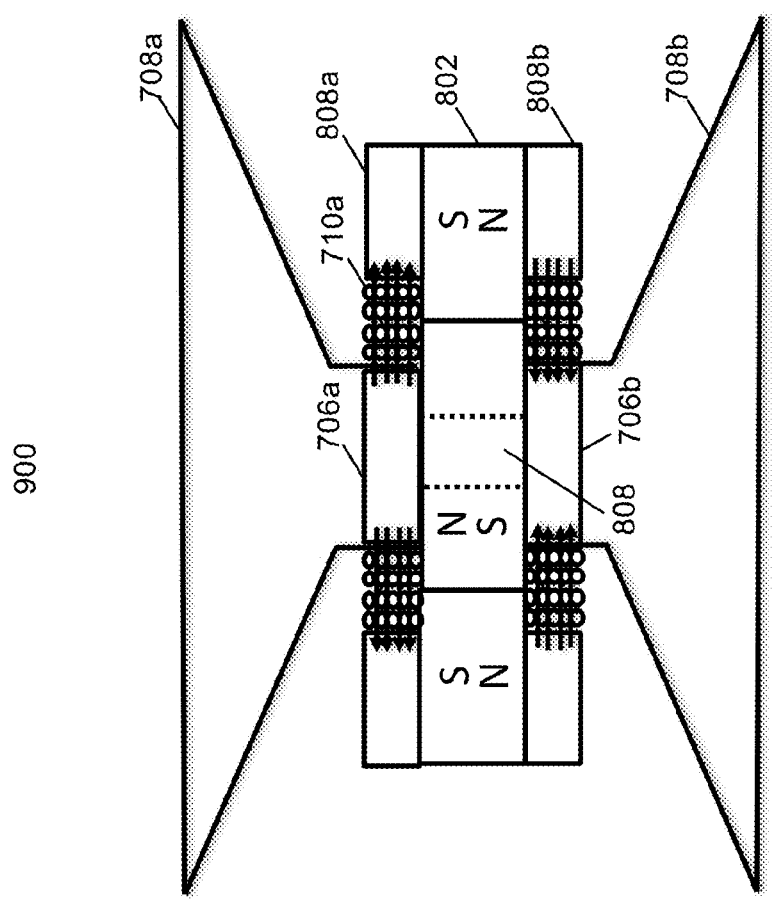
FIG. 9 depicts another exemplary speaker system in accordance with the invention.

FIG. 9 depicts another exemplary speaker system 900 in accordance with the invention. Referring to FIG. 9, the speaker system 900 is similar to the speaker system 800 of FIGS. 8A and 8B except on the top side of the multi-pole magnet 802, a ring-shaped first ferromagnetic flux circuit 806a is in contact with the outer portion of the multi-pole magnet 802 and a circular second ferromagnetic flux circuit 706a is in contact with the inner portion of the multi-pole magnet 802. A coil 710a is located between the first and second ferromagnetic flux circuits 806a and 706a. Depending on the direction of current through the coil 710a, a speaker cone 708a associated with the coil 710a will move up or down. Similarly, on the bottom side of the multi-pole magnet 802, a ring-shaped first ferromagnetic flux circuit 806b is in contact with the outer portion of the multi-pole magnet 802 and a circular second ferromagnetic flux circuit 706b is in contact with the inner portion of the multi-pole magnet 802. A coil 710b is located between the first and second ferromagnetic flux circuits 806b and 706b. Depending on the direction of current through the coil 710b, a speaker cone 708b associated with the coil 710b will move up or down.

Generally, two coils such as shown in FIG. 9 can drive two objects independently or the two object can be driven together where the two coils may or may not be wired in series and the two objects may or may not be coupled.

Figure 10:
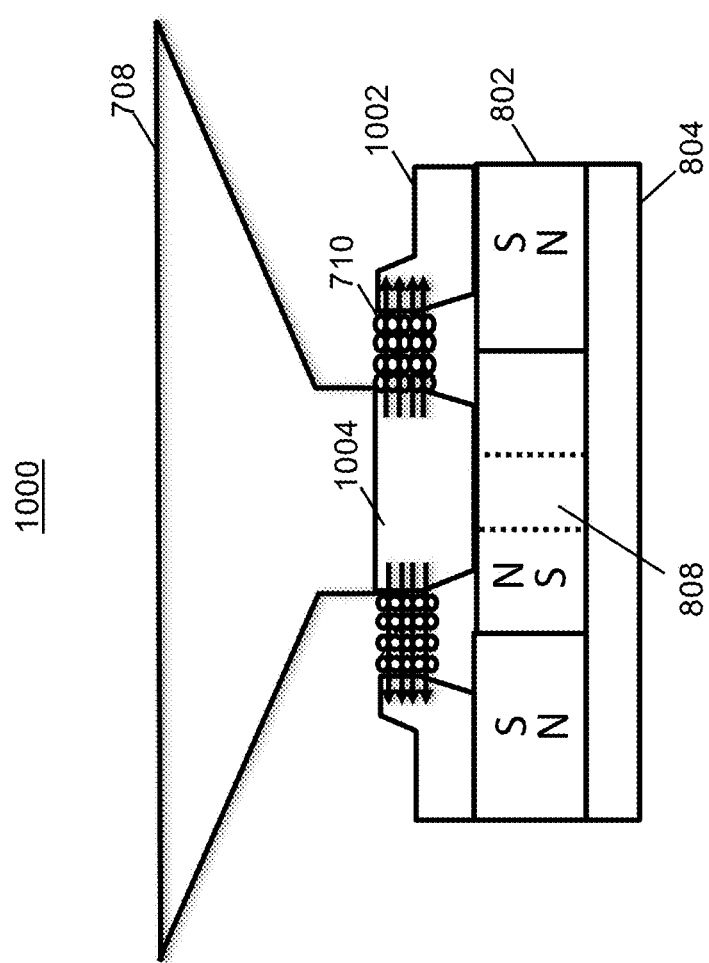
FIG. 10 depicts yet another exemplary speaker system in accordance with the invention.

FIG. 10 depicts an exemplary speaker system 1000 in accordance with the invention. Referring to FIG. 10, the speaker system 1000 is the same as the speaker system 800 of FIGS. 8A and 8B except it has a ring-shaped first ferromagnetic flux circuit 1002 and a circular second ferromagnetic flux circuit 1004 that are further shaped to provide additional clearance between the multi-pole magnet 802 and the coil 710 above the polarity transition region of the magnet.

Figure 11B:
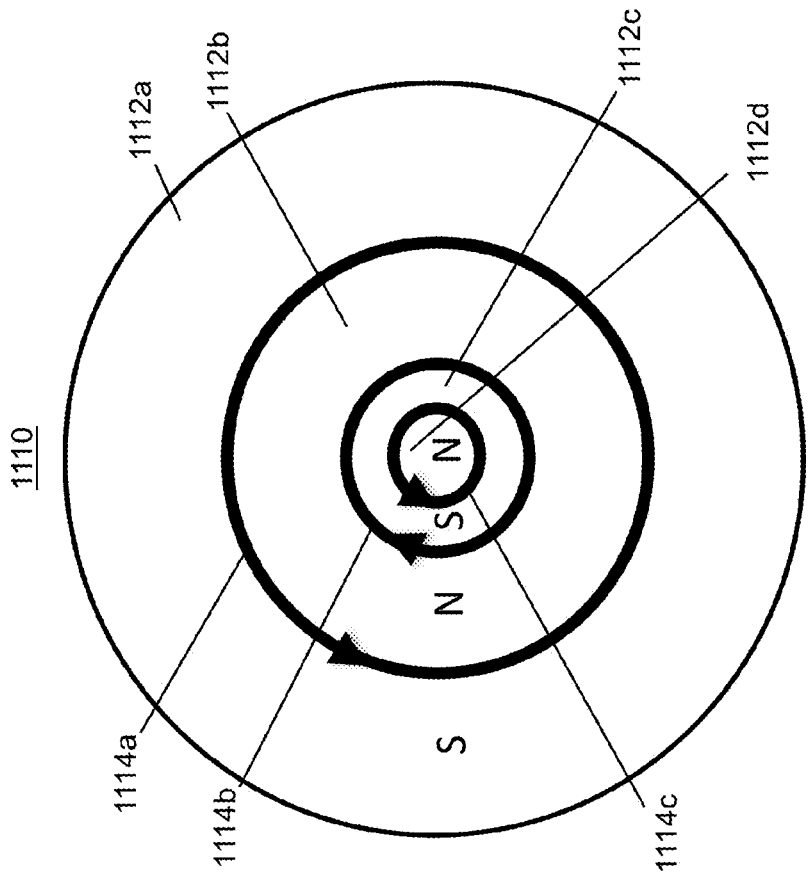
FIG. 11B depicts another exemplary circular multi-pole magnet having four alternating polarity concentric circles that are similar to those of FIG. 11A except the sizes of the concentric circles correspond to a Barker 7 code.
Figure 11A:
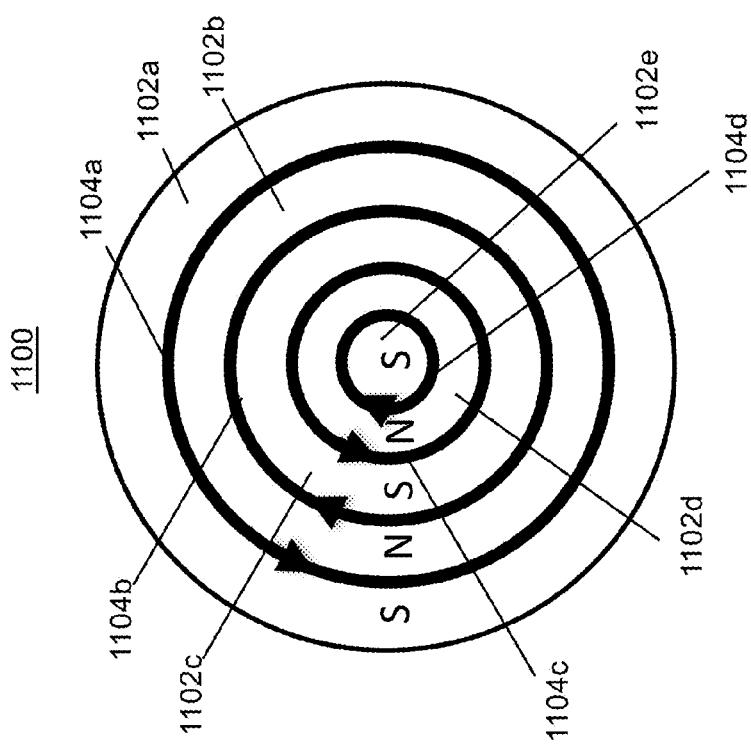
FIG. 11A depicts an exemplary circular multi-pole magnet having five alternating polarity concentric circles and four coils that are located proximate to the polarity transition regions corresponding to the four polarity transition boundaries of the magnet.

FIG. 11A depicts an exemplary circular multi-pole magnet 1100 having five alternating polarity concentric circles 1102a-1102e and four coils 1104a-1104d that are located proximate to the polarity transition regions corresponding to the four polarity transition boundaries of the multi-pole magnet 1100. Referring to FIG. 11A, the multi-pole magnet 1100 includes five concentric circles 1102a-1102e. The outer first circle 1102a has a South-up polarity. A second circle 1102b that is adjacent to the outer circle 1102a has a North-up polarity, where there is a polarity transition boundary between the first and second circles 1102a and 1102b above which a first coil 1104a is positioned. Similarly, second, third, and fourth coils 1104b-1104d are positioned above second, third and fourth polarity transition boundaries between the various opposite polarity circles of the magnet.

FIG. 11B depicts another exemplary circular multi-pole magnet 1110 having four alternating polarity concentric circles 1112a-1112d that are similar to those of FIG. 11A except the sizes of the concentric circles 1112a-1112d correspond to a Barker 7 code. Otherwise, there are first, second, and third coils 1114a-1114c that are positioned above the first, second, and third polarity transition boundaries between the various opposite polarity circles of the magnet. Generally, one skilled in the art will recognize that sizes of the concentric circles can be selected in order to substantially achieve a 1:1 North polarity to South polarity area ratio (i.e., a polarity balance) so as to minimize leakage and maximize efficiency.

Figure 12B:
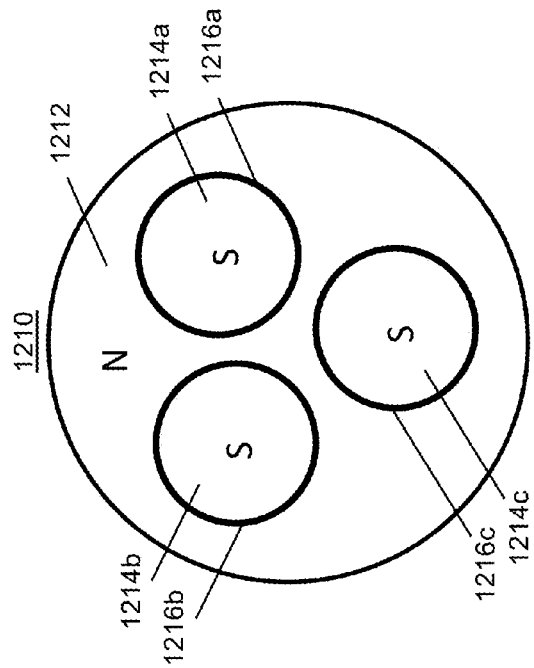
FIG. 12B depicts an exemplary multi-pole magnet having been initially magnetized to have a first polarity on a first side and a second polarity on a second side opposite the first side.
Figure 12A:
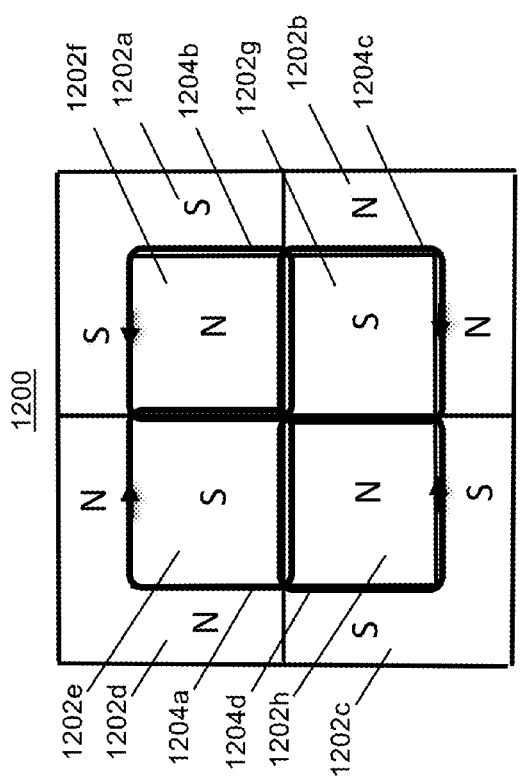
FIG. 12A depicts an exemplary square multi-pole magnet having a two dimensional alternating polarity pattern that produces four rectangular shaped magnetic sources having outer boundaries that are polarity transition boundaries above which four coils are located.

FIG. 12A depicts an exemplary square multi-pole magnet 1200 having a two dimensional alternating polarity pattern that produces four rectangular shaped magnetic sources 1202e-1202h having outer boundaries that are polarity transition boundaries above which four coils 1204a-1204d are located.

FIG. 12B depicts an exemplary multi-pole magnet 1210 having been initially magnetized to have a first polarity on a first side and a second polarity on a second side opposite the first side. The multi-pole magnet 1210 was subsequently magnetized to have three circular magnetic sources 1214a-1214c having the second polarity on the first side of the magnet that produce three transition boundaries 1216a-1216c above which coils 710a-710c (not shown) are positioned.

Figure 13B:
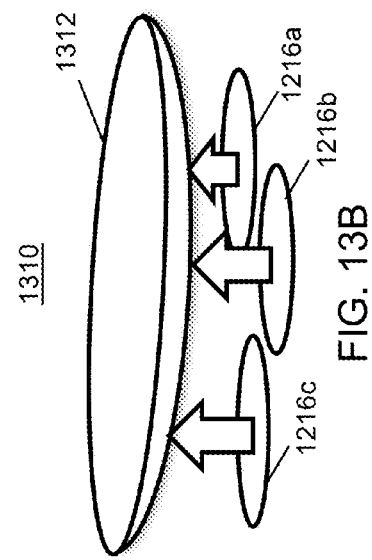
FIG. 13B depicts an exemplary movement system, where a mirror is being oriented by varying the currents provided to the three coils above the three polarity transition boundaries of FIG. 12B.
Figure 13A:
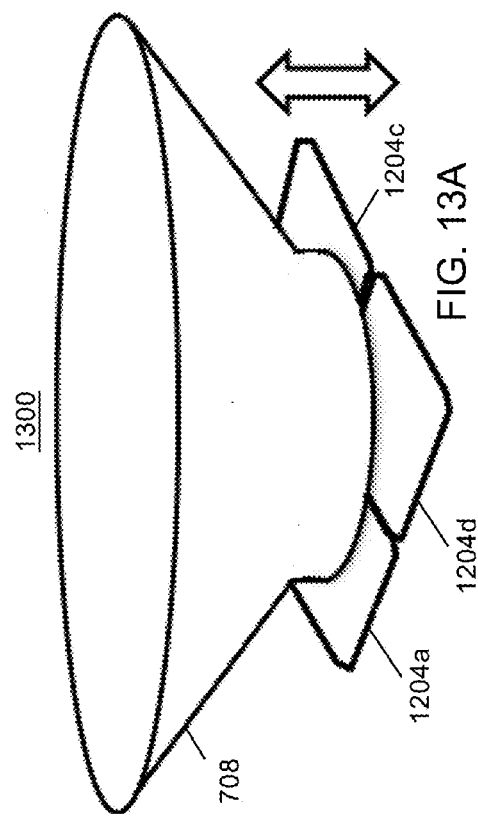
FIG. 13A depicts a movement system, where a cone of a speaker is being driven by the four coils of FIG. 12A.

FIG. 13A depicts a movement system 1300, where a speaker cone 708 is being driven by the four coils 1204a-1204d of FIG. 12A, where the coils are provided currents in such a manner as to move the speaker cone 708 up and down as if it were a piston.

FIG. 13B depicts an exemplary movement system 1310, where a mirror 1312 is being oriented by varying the currents provided to the three coils 710a-710c above the three polarity transition boundaries 1216a-1216c of FIG. 12B, where the coils 710a-710c are provided currents in such a manner as to direct the mirror 1312, for example, to direct light towards an object.

Figure 14:
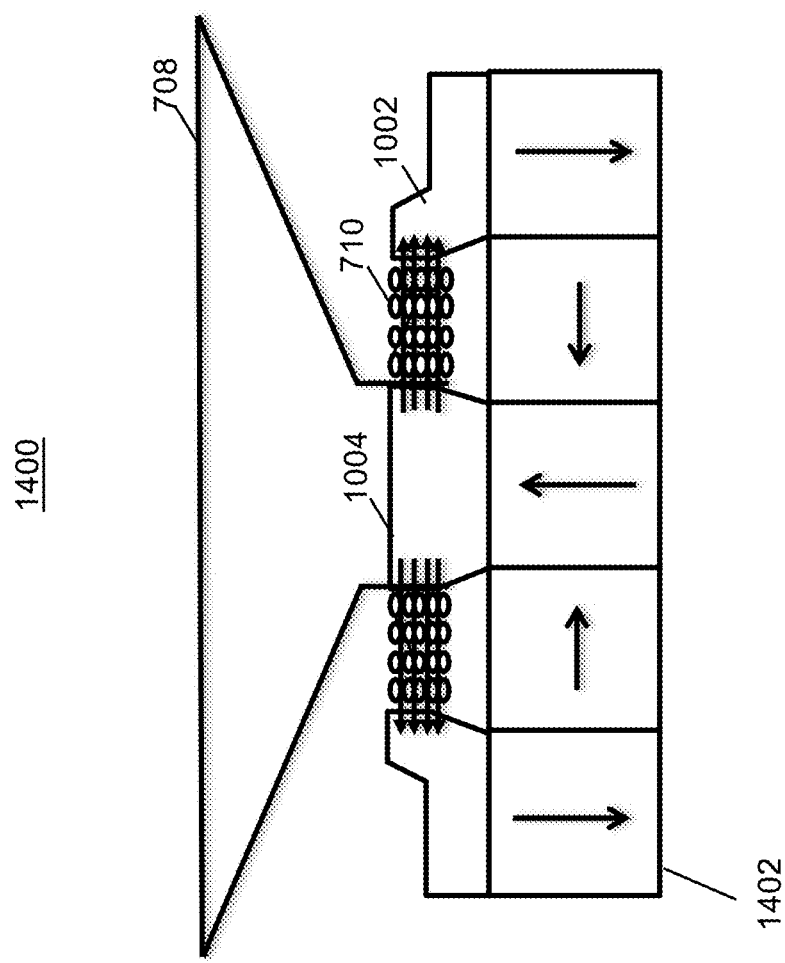
FIG. 14 depicts an exemplary Halbach magnet array and coil arrangement in accordance with the invention.

FIG. 14 depicts an exemplary Halbach magnet array and coil arrangement 1400 in accordance with the invention. Referring to FIG. 14, a Halbach magnet array 1402 has a ring-shaped first ferromagnetic flux circuit 1002 and a circular second ferromagnetic flux circuit 1004 that are further shaped to provide additional clearance between the Halbach magnet array 1402 and the coil 710 above the polarity transition region of the Halbach magnet array 1402.

While particular embodiments of the invention have been described, it will be understood, however, that the invention is not limited thereto, since modifications may be made by those skilled in the art, particularly in light of the foregoing teachings.

The invention claimed is:

1. A magnet and coil assembly comprising:
a magnet structure comprising an axially magnetized first dipole portion and an axially magnetized second dipole portion, wherein the first dipole portion is adjacent to the second dipole portion at a first boundary, and wherein the first and second dipole portions have oppositely oriented polarities at the first boundary; and
a movable first coil having a central axis coaxial to a central axis of the first dipole portion, wherein the first coil is proximal to and spaced apart from a first surface of the magnet structure.

2. The magnet and coil assembly of claim 1, wherein the first coil includes an inner coil boundary and an outer coil boundary, and wherein the first boundary of the magnet structure includes a boundary axis that extends between the inner coil boundary and the outer coil boundary.

3. The magnet and coil assembly of claim 2, wherein the boundary axis is substantially perpendicular to the first surface of the magnet structure and is substantially parallel to the central axis of the first coil.

4. The magnet and coil assembly of claim 1, wherein the first boundary corresponds to an outer perimeter of the first dipole portion.

5. The magnet and coil assembly of claim 4, wherein the first dipole portion is substantially disc-shaped and the second dipole portion is substantially ring-shaped, and wherein the second dipole portion surrounds the first dipole portion at the first boundary.

6. The magnet and coil assembly of claim 4, wherein the first dipole portion is substantially rectangular and wherein the second dipole portion surrounds the first dipole portion at the first boundary.

7. The magnet and coil assembly of claim 1, further comprising:
a movable second coil having a central axis;
wherein the magnet structure comprises an axially magnetized third dipole portion adjacent to the second dipole portion at a second boundary, and wherein the second and third dipole portions have oppositely oriented polarities at the second boundary; and
wherein the central axis of the second coil is coaxial to a central axis of the third dipole portion.

8. The magnet and coil assembly of claim 1, wherein the first dipole portion and the second dipole portion are each discrete magnets.

9. The magnet and coil assembly of claim 1, further comprising a shunt plate proximal to a second surface of the magnet structure opposite to the first surface, wherein the shunt plate is configured to route flux between the first and second dipole portions.

10. The magnet and coil assembly of claim 1, further comprising a movable second coil provided coaxially with the first dipole portion, wherein the second coil is proximal to and spaced apart from a second surface of the magnet structure opposite to the first surface.

11. The magnet and coil assembly of claim 1, further comprising:
a first ferromagnetic flux circuit configured to route first magnetic flux from the first surface of the first dipole portion substantially ninety degrees from a first flux-circuit-to-magnet interface to a first side of a gap; and
a second ferromagnetic flux circuit configured to route second magnetic flux from the first surface of the second dipole portion substantially ninety degrees from a second flux-circuit-to-magnet interface to a second side of the gap;
wherein at least a portion of the first coil is disposed in the gap.

12. A loudspeaker assembly comprising:
a multiple-pole magnet structure comprising a first magnetic region having a central magnet axis and a first polarity orientation, a second magnetic region adjacent to the first magnetic region and having a second polarity orientation, and a polarity transition between the first and second magnetic regions; and
a loudspeaker coil provided above and spaced apart from the magnet structure, the coil having a central coil axis that is substantially collinear with the central magnet axis of the first magnetic region, and the loudspeaker coil includes an inner coil boundary and an outer coil boundary that extend perpendicular to a first surface of the magnet structure at or near the polarity transition region.

13. The loudspeaker assembly of claim 12, further comprising first and second ferromagnetic flux circuits provided adjacent to the first and second magnetic regions, respectively, at the first surface of the magnet structure and configured to direct flux from the first and second magnetic source regions to a first gap, wherein at least a portion of the loudspeaker coil is disposed in the first gap.

14. The loudspeaker assembly of claim 13, wherein the first gap extends perpendicular to the first surface of the magnet structure, and wherein the first and second ferromagnetic flux circuits are configured to route magnetic flux substantially ninety degrees from the first surface of the magnet structure to respective sidewalls of the first gap.

15. The loudspeaker assembly of claim 13, further comprising a shunt plate provided about the first and second magnetic regions at a second surface of the magnet structure opposite to the first surface.

16. The loudspeaker assembly of claim 13, further comprising:
a second loudspeaker coil; and
third and fourth ferromagnetic flux circuits provided adjacent to the first and second magnetic regions, respectively, at an opposite second surface of the magnet structure and configured to direct flux from the third and fourth magnetic source regions to a second gap, wherein the second loudspeaker coil is at least partially disposed in the second gap.

17. The loudspeaker assembly of claim 12, wherein the first and second magnetic regions are substantially circular and concentric.

18. The loudspeaker assembly of claim 17, wherein the second magnetic region is ring shaped and substantially surrounds the first magnetic region.

19. The loudspeaker assembly of claim 12, wherein the polarity transition includes a region of the magnet structure that is one of substantially circular or substantially rectangular.

20. A speaker system comprising:
a loudspeaker coil coupled to a loudspeaker speaker cone;
a multiple-pole magnet, including:
an inner magnet region having a first polarity;
an outer magnet region provided adjacent to the inner magnet region and having an opposite second polarity; and
a transition region at an interface between the inner and outer magnet regions, the transition region defining a transition axis through the multiple-pole magnet; and
an inner ferromagnetic flux circuit provided adjacent to the inner magnet region of the multiple-pole magnet; and
an outer ring-shaped ferromagnetic flux circuit provided adjacent to the outer magnet region of the multiple-pole magnet;
wherein the inner and outer ferromagnetic flux circuits provide respective inner sidewall and outer sidewall portions of a first gap;
wherein at least a portion of the loudspeaker coil is suspended in the first gap; and
wherein the loudspeaker coil includes a coil axis that is parallel to the transition axis.

21. The speaker system of claim 20, wherein the first gap is provided adjacent to the transition region.

22. The speaker system of claim 20, further comprising a second loudspeaker coil coupled to a second loudspeaker cone, wherein the first and second loudspeaker coils are suspended at respective opposite surfaces of the multiple-pole magnet at the transition region.

23. The magnet and coil assembly of claim 1, wherein the magnet structure comprises a printed magnetic field emission structure.

24. The loudspeaker assembly of claim 12, wherein the multiple-pole magnet structure comprises a printed magnetic field emission structure.

25. The magnet and coil assembly of claim 1, wherein the first dipole portion of the magnet structure comprises a hollow hole that extends from the first surface of the magnet structure to an opposite second surface of the magnet structure.

26. The loudspeaker assembly of claim 12, wherein the multiple-pole magnet structure comprises a hollow hole having a central axis that is coaxial with the central magnet axis.

27. The magnet and coil assembly of claim 1, wherein an area ratio of a first surface area of the first dipole portion at the first surface of the magnet structure and a second surface area of the second dipole portion at the first surface of the magnet structure is substantially 1:1.

28. The loudspeaker assembly of claim 12, wherein the first and second magnetic regions of the multiple-pole magnet structure have an area ratio of about 1:1.

* * * * *